United States Patent [19]

Klein

[11] Patent Number: 4,697,768

[45] Date of Patent: Oct. 6, 1987

[54] FLIGHT CONTROL SYSTEM EMPLOYING COMPLEMENTARY FILTER

[75] Inventor: Robert W. Klein, Rancho Palos Verdes, Calif.

[73] Assignee: Grumman Aerospace Corporation, Bethpage, N.Y.

[21] Appl. No.: 797,089

[22] Filed: Nov. 12, 1985

[51] Int. Cl.⁴ ............................................. B64C 13/16
[52] U.S. Cl. ........................................ 244/191; 364/434; 318/584
[58] Field of Search .............. 244/75 R, 75 A, 76 R, 244/76 B, 76 C, 191, 175, 193, 181, 194, 45 R, 45 A; 364/434, 435; 318/584

[56] References Cited

U.S. PATENT DOCUMENTS

| | | | |
|---|---|---|---|
| 3,077,557 | 2/1963 | Joline et al. | 244/193 |
| 3,137,459 | 6/1964 | Smith et al. | 244/193 |
| 3,241,077 | 3/1966 | Smyth et al. | 244/193 |
| 4,161,300 | 7/1979 | Schwaerzler | 244/45 R |

Primary Examiner—Galen Barefoot
Attorney, Agent, or Firm—Pollock, VandeSande & Priddy

[57] ABSTRACT

Strake, flap and canard control surfaces of an aircraft are driven by an error signal which is comprised of a pilot stick command signal and feedback components including measured vertical acceleration and pitch rate of the aircraft and a third feedback component derived from a complementary filter. The filter has a high-pass filter section which operates upon canard position data and a low-pass filter section which operates upon pitch rate. A summation of the signals passing both filtering sections is summed with the vertical acceleration and pitch rate feedback signals to form a combined feedback signal.

8 Claims, 3 Drawing Figures

FLIGHT CONTROL SYSTEM EMPLOYING COMPLEMENTARY FILTER

FIELD OF THE INVENTION

The present invention relates to flight control systems, and more particularly to such a system employed in an aircraft equipped with a movable canard.

BACKGROUND OF THE INVENTION

Modern aircraft designs have included multi-control surface aircraft, such as the X-29 aircraft which employs a movable canard. Due to the location of the center of gravity of such an aircraft, there is inherent instability which must be carefully attended to by a computer-aided pilot flight control system. In conventional systems, feedback in the flight control system is provided with normal acceleration and pitch rate parameters, derived from gyros and accelerometers. This feedback data is supplied to a servo system which is intended to stabilize the aircraft.

In multi-control surface high performance aircraft such as the canard-equipped X-29, the craft is inherently unstable, and dependence upon conventional flight control system technology has raised the problems of stability margin and high control actuator noise. At high operational speeds, these factors detract from the effectiveness of such an aircraft.

BRIEF DESCRIPTION OF THE PRESENT INVENTION

The present invention is an improvement of the flight control systems of the prior art. Strake, flap and canard control surfaces of an aircraft are driven by an error signal whichis comprised of a pilot stick command signal and feedback components including measured vertical acceleration and pitch rate of the aircraft and a third feedback component derived from a complementary filter. The filter has a high-pass filter section which operates upon canard position data and a low-pass filter section which operates upon pitch rate. A summation of the signals passing both filtering sections is summed with the vertical acceleration and pitch rate feedback signals to form a combined feedback signal. As a result, the stability margin of an inherently unstable aircraft, incorporating a canard, is increased; and aircraft vibration is damped to a greater extent due to lower control actuator noise.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
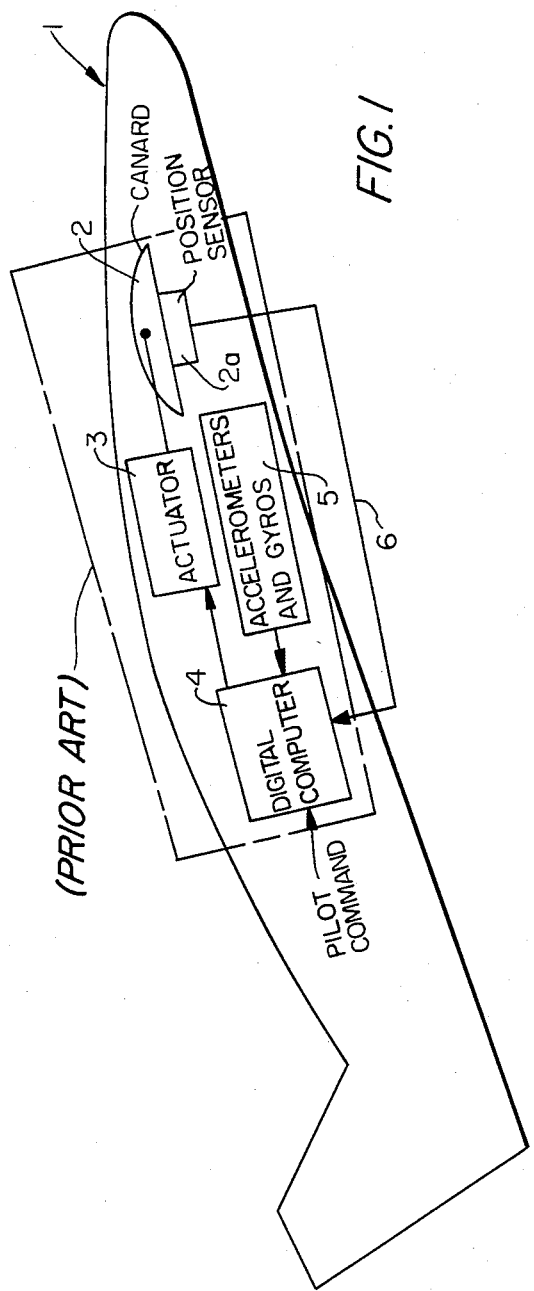
FIG. 1 is a schematic illustration of a canard-equipped aircraft incorporating a basic flight control system, shown in block diagram form.

FIG. 1 schematically illustrates an aircraft 1 having a control surface 2, which may be a canard, such as employed in the X-29 jet aircraft. An actuator 3 variably positions the control surface 2 by conventional means. A flight control digital computer 4 of known design includes a number of inputs including a pilot command input and data inputs from accelerometers and gyros, collectively referred to by reference numeral 5. Thus far, the system described employs conventional components and subsystems to achieve flight control of a control surface. However, the present invention incorporates position data from the control surface itself, which serves as an additional input 6 to digital computer 4 which, in accordance with the present invention, must perform a complementary filtering function, as will be explained hereinafter.

Figure 2:
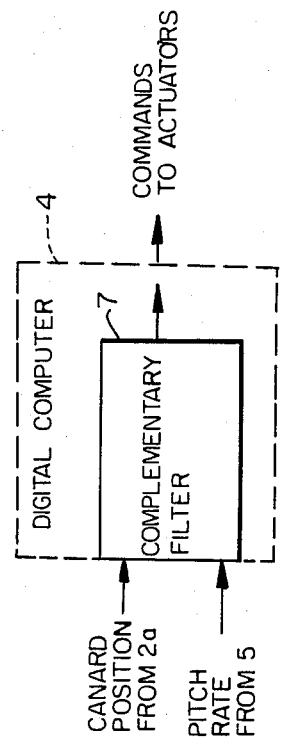
FIG. 2 is a schematic illustration of a complementary filter, incorporated in a flight control digital computer.

FIG. 2 is a basic schematic illustration of digital computer 4 which is seen to include the necessary memory and control for achieving the function of a complementary filter 7. By being provided with canard position data as well as pitch rate data, the complementary filter 7 estimates pitch acceleration; further, the filter simultaneously reduces flight control system noise and improves aircraft stability margins.

Figure 3:
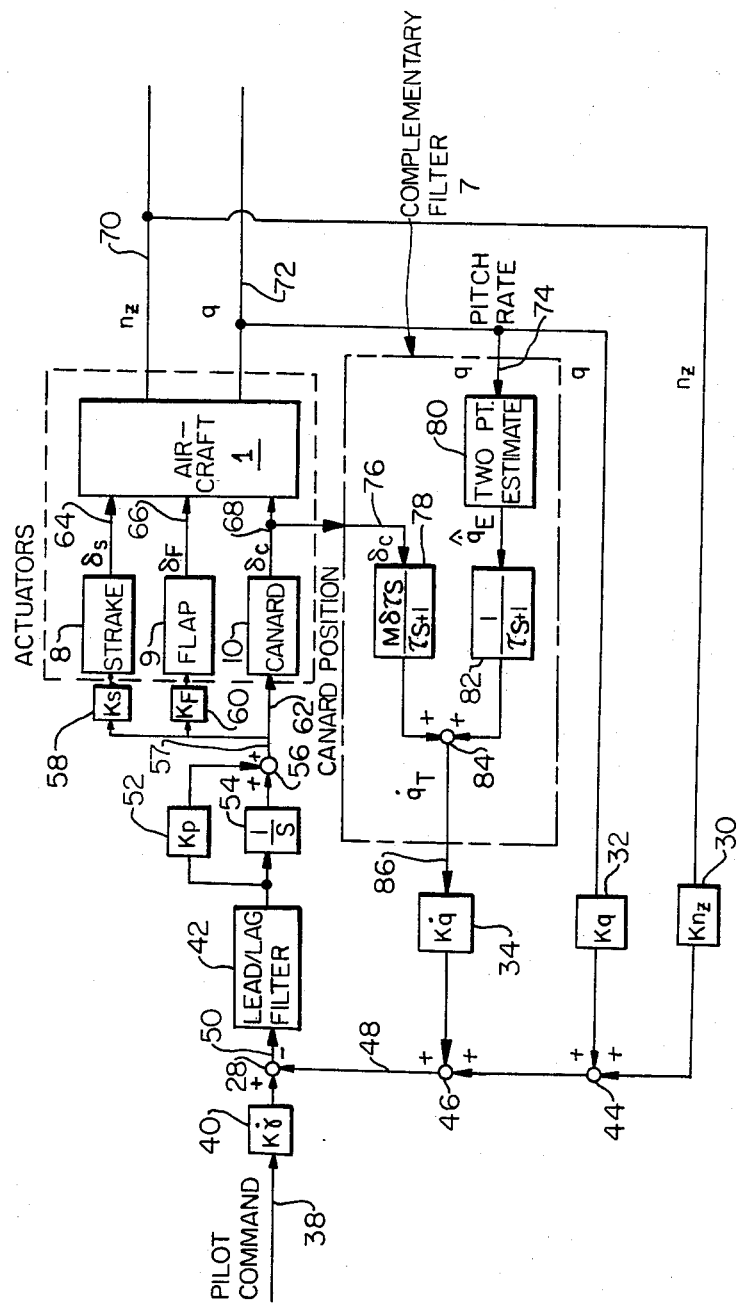
FIG. 3 is a block diagram of a flight control system incorporating the present invention.

An implementation of the present invention is illustrated in FIG. 3. The flight control circuit illustrated drives a strake actuator 8, flap 9, and canard 10 of the aircraft 1, which was schematically illustrated in FIG. 1 and indicated as a block in FIG. 3, with a corresponding numeral 1. A pilot command signal on input line 38 is a pilot stick signal ($K_y$) which is multiplied in amplifier 40 by a gain. The resulting amplified signal is fed to difference point 28 where a number of feedback signals are subtracted from the amplified stick signal. These feedback signals include vertical acceleration $n_z$, which is detected along output line 70 of a conventional aircraft accelerometer (not shown) followed by amplification in amplifier 30 by a gain factor $K_{nz}$. This amplified vertical acceleration feedback signal is summed with a pitch rate signal which is measured by a conventional aircraft gyroscope (not shown) and amplified at amplifier 32 by a gain $K_q$. Normally, these two feedback signals are cumulatively subtracted from the amplified stick signal at point 28. However, in the present invention, a third feedback signal is provided from complementary filter 7 to summation point 46 where it is summed with the previously discussed feedback signals that were summed at point 44. This third feedback signal which is input to summing point 46 undergoes amplification in amplifier 34 by a gain $K_{\dot{q}}$. The error signal appearing at the output 50 of difference point 28 is fed to a lead/lag filter of conventional design which differentiates the signal from point 28 thereby reforming the signal to a spike which has the capability of triggering faster response time by the circuitry of FIG. 3.

The output from the lead/lag filter 42 undergoes integration through integrator 54, the output of which is summed at 56 with the filtered signal having undergone amplification by amplifier 52 having a gain $K_p$.

The resulting error signal is fed along line 57 in parallel to amplifiers 58 and 60 which respectively amplify the inputs thereto by gains $K_s$ and $K_f$. These amplifiers respectively drive strake and flap actuators 8 and 9, which are of conventional design. The signal from summing point 56 is directly connected via line 62 to canard 10. Thus, for a particular error signal present at summing point 56, individual gains are provided to the control surface actuators in order to maintain stability for aircraft 1. The actual gains may be empirically derived for a particular aircraft in accordance with well-known techniques.

The outputs from the strake, flap and canard actuators are respectively indicated by the angular quantities $\delta_S$, $\delta_F$ and $\delta_C$ on individual parallel actuator control lines 64, 66 and 68. The respective control surfaces, namely, the strake, flap and canard undergo the indicated angular displacement thereby varying the flight control characteristics for aircraft 1. As an aircraft changes its flight path, new vertical acceleration $n_z$ and pitch rate (q) occur to be fed back. The pitch rate q is not only fed back to the amplifier 32, but also forms the input to the complementary filter 7. Thus, the pitch rate signal from line 72 is connected to an input terminal 74 of a two-point estimator 80 which performs a well-known flight control calculation on pitch rate to form a translated quantity $\dot{q}_E$. This quantity is then fed to the input of a low-pass filter 82 which basically integrates the output from the two-point estimator circuit 80 and forms a first input at summing point 84.

Canard position data $\delta_C$ present on control line 68 is connected in parallel to the complementary filter 7 so as to form a second input thereto. This input is connected to a high-pass filter 78, via connection line 76. The high-pass filter has a gain $M_\delta$ which relates to a well-known flight control moment parameter. The complementary filter 7 is so named due to the fact that the low-pass 82 filter operates upon pitch rate, and the high-pass filter 78 operates upon the canard position. Otherwise stated, high and low frequency components from pitch rate and canard position, respectively, complement one another. The time constants $\tau$ for filters 78 and 82 are chosen to achieve maximum stability margin.

The outputs from filters 78 and 82 are added at summing point 84 to form a filter output signal $\dot{q}_T$, along line 86, which is then input to the amplifier 34 resulting in an amplified feedback signal from the complementary filter which is added at summing point 46 to the other two feedback signals from summing point 44. The resultant feedback signal is connected via line 48 to point 28, where a total error signal is formed.

It should be understood that the invention is not limited to the exact details of construction shown and described herein for obvious modifications will occur to persons skilled in the art.

I claim:

1. In a flight control system for reducing a multi-control surface aircraft wherein an error signal is formed from signal components including a pilot stick signal and a composite feedback signal, the system comprising:
   means for sensing vertical acceleration of an aircraft and generating a signal corresponding thereto;
   means for sensing pitch rate of an aircraft and generating a signal corresponding thereto;
   a complementary filter having
   (a) means for high-pass filtering a signal generated from a position sensor connected to one of the control surfaces;
   (b) means for low-pass filtering the signal generated from the position sensor connected to the control surface;
   (c) means for summing the low and high pass filtered signals;
   means for combining the stick signal, vertical acceleration, pitch rate, and summed filtered signals to form the error signal; and
   means for connecting the error signal to actuators for each of the multi-control surfaces.

2. The structure set forth in claim 1 wherein said control surface having a position sensor connected thereto is a canard.

3. The structure set forth in claim 2 wherein the high-pass filtering means comprises means for differentiating the sensor signal from the canard with a time constant selected to maximize stability margin for the aircraft.

4. The structure set forth in claim 2 wherein the low-pass filtering means comprises:
   means for estimating a value of pitch rate from a two-point estimate; and
   means connected to the two-point estimating means for integrating the estimated value of pitch rate with a time constant selected to maximize the stability margin for the aircraft.

5. The structure set forth in claim 4 wherein the high-pass filtering means comprises means for differentiating the sensor signal from the canard with a time constant selected to maximize the stability margin for the aircraft.

6. A flight control method for use with a multi-control aircraft comprising the steps:
   sensing vertical acceleration of an aircraft and generating a signal corresponding thereto;
   sensing pitch rate of an aircraft and generating a signal corresponding thereto;
   high-pass filtering a signal generated from a position sensor connected to one of the aircraft control surfaces;
   low-pass filtering the signal generated from the position sensor connected to the control surfaces;
   summing the filtered signals;
   combining the stick signal, vertical acceleration, pitch rate and summed filtered signals to form the error signal; and
   connecting the error signal to actuators for each of the multi-control surfaces.

7. The method set forth in claim 6 wherein the high-pass filtering further comprises the step of differentiating the sensor signal from a control surface with a time constant selected to maximize stability margin for the aircraft.

8. The method set forth in claim 7 wherein the low-pass filtering further comprises the steps:
   estimating a value of pitch rate from a two-point estimate; and integrating the estimated pitch rate with a time constant selected to maximize the stability margin for the aircraft.

* * * * *

UNITED STATES PATENT AND TRADEMARK OFFICE
CERTIFICATE OF CORRECTION

PATENT NO. : 4,697,768
DATED : October 6, 1987
INVENTOR(S) : Robert W. Klein

It is certified that error appears in the above-identified patent and that said Letters Patent is hereby corrected as shown below:

Column 1, line 35, change "whichis" to --which is--.

Column 3, line 47, change "reducing" to --increasing the stability of--.

Column 4, lines 1-3, change "the signal generated from the position sensor connected to the control surface" to --a translated value of the pitch rate--.

Column 4, lines 40-42, change "the signal generated from the position sensor connected to the control surfaces" to --a translated value of the pitch rate--.

Signed and Sealed this

Seventeenth Day of May, 1988

Attest:

DONALD J. QUIGG

Attesting Officer

Commissioner of Patents and Trademarks